United States Patent
Wang et al.

(10) Patent No.: US 8,276,856 B2
(45) Date of Patent: Oct. 2, 2012

(54) SUPPORT MECHANISM HAVING TWO DETACHABLE COVERS AND HINGE

(75) Inventors: Te-Hsu Wang, Miao-Li (TW); Zhi-Qu Jiao, Shenzhen (CN)

(73) Assignees: Innocom Technology (ShenZhen) Co., Ltd., Shenzhen, Guangdong Province (CN); Chimei Innolux Corporation, Miao-Li County (TW)

( * ) Notice: Subject to any disclaimer, the term of this patent is extended or adjusted under 35 U.S.C. 154(b) by 49 days.

(21) Appl. No.: 12/770,765

(22) Filed: Apr. 30, 2010

(65) Prior Publication Data
US 2011/0095145 A1 Apr. 28, 2011

(30) Foreign Application Priority Data
Oct. 28, 2009 (CN) .......................... 2009 1 0308956

(51) Int. Cl.
- F16L 3/00 (2006.01)
- A47F 5/02 (2006.01)
- A47F 5/12 (2006.01)
- A47G 29/00 (2006.01)
- F16M 13/00 (2006.01)

(52) U.S. Cl. ...................... 248/121; 248/125.9; 248/130; 248/371; 248/158; 248/139; 248/146; 248/185.1; 248/288.11; 248/291.1; 361/679.21; 361/679.22

(58) Field of Classification Search .................. 248/121, 248/125.9, 130, 371, 158, 139, 146, 185.1, 248/288.11, 291.1, 917–923; 361/679.21, 361/679.22
See application file for complete search history.

(56) References Cited

U.S. PATENT DOCUMENTS

| | | | | |
|---|---|---|---|---|
| 2,482,911 | A * | 9/1949 | Holstein | 452/47 |
| 5,100,098 | A * | 3/1992 | Hawkins | 248/291.1 |
| 5,144,290 | A * | 9/1992 | Honda et al. | 345/156 |
| 5,730,406 | A * | 3/1998 | Chen | 248/223.41 |
| 6,167,922 | B1 * | 1/2001 | Seitz et al. | 141/97 |
| 6,400,560 | B1 * | 6/2002 | Chian | 361/679.27 |
| 6,727,961 | B2 * | 4/2004 | Yang | 349/58 |
| 6,758,454 | B2 * | 7/2004 | Smed | 248/314 |
| 6,837,469 | B2 * | 1/2005 | Wu et al. | 248/278.1 |
| 6,909,598 | B2 * | 6/2005 | Cheng et al. | 361/679.22 |
| 7,267,312 | B2 * | 9/2007 | Kang et al. | 248/291.1 |
| 7,414,832 | B2 * | 8/2008 | Wang et al. | 361/679.27 |
| 7,460,361 | B2 * | 12/2008 | Yiu | 361/679.27 |
| 7,492,580 | B2 * | 2/2009 | Lee | 361/679.27 |
| 7,513,468 | B2 * | 4/2009 | Jung et al. | 248/133 |
| 7,559,520 | B2 * | 7/2009 | Quijano et al. | 248/309.1 |
| 7,607,621 | B2 * | 10/2009 | Cai et al. | 248/188 |
| 7,672,121 | B2 * | 3/2010 | Li et al. | 361/679.21 |
| 2002/0130981 | A1 * | 9/2002 | Ma et al. | 348/843 |
| 2003/0132360 | A1 * | 7/2003 | Ju | 248/371 |
| 2004/0057197 | A1 * | 3/2004 | Hill et al. | 361/683 |
| 2005/0035252 | A1 * | 2/2005 | Chen | 248/284.1 |
| 2005/0248912 | A1 * | 11/2005 | Kang et al. | 361/681 |

(Continued)

*Primary Examiner* — Terrell McKinnon
*Assistant Examiner* — Christopher Garft
(74) *Attorney, Agent, or Firm* — Bacon & Thomas, PLLC

(57) ABSTRACT

A support mechanism includes a base assembly and a hinge assembly. The base assembly includes a first cover and a second cover attached to the first cover. The first cover forms two first locking members and the second cover forms two restriction members. The hinge assembly includes a bracket and two pivot units rotatably connected to the bracket. The bracket includes a fixing portion and two connecting portions extending from opposite sides of the fixing portion. The first locking members are latched with the fixing portion of the bracket, and the restriction members engage the first locking members to prevent the first locking members from moving.

15 Claims, 4 Drawing Sheets

U.S. PATENT DOCUMENTS

| | | | |
|---|---|---|---|
| 2006/0027718 A1* | 2/2006 | Quijano et al. | 248/121 |
| 2006/0076463 A1* | 4/2006 | Drew | 248/121 |
| 2006/0202090 A1* | 9/2006 | Lee et al. | 248/121 |
| 2006/0231697 A1* | 10/2006 | Hsu | 248/125.9 |
| 2007/0097617 A1* | 5/2007 | Searby et al. | 361/686 |
| 2010/0238617 A1* | 9/2010 | Su | 361/679.01 |

* cited by examiner

SUPPORT MECHANISM HAVING TWO DETACHABLE COVERS AND HINGE

BACKGROUND

1. Technical Field

The present disclosure relates to a support mechanism, and particularly to a support mechanism for a liquid crystal display.

2. Description of Related Art

Many liquid crystal display devices include support mechanisms that are adjustable, such that viewing angles of the displays can be changed. The support mechanisms often include base stands which are connected to the displays by hinge assemblies. The hinge assemblies are generally fixed to the base stands with a plurality of screws. However, during assembly, the screws require individually to be screwed onto the hinge assemblies and the base stands, thereby costing time and creating inconvenience.

A commonly used support mechanism for a liquid crystal display device includes a base and a hinge assembly partially received therein. The base includes a latching portion. The hinge assembly includes a bracket, a resilient member, and a movable board. The resilient member and the movable board are formed on the bracket. The resilient member is pressed by the movable board to be received in the base, and the deformation of the resilient member is released after being received in the base, thereby, the hinge assembly is latched to the base and engages the latching portion. In the support mechanism, a resilient member and a movable board are required to lock the support mechanism and to latch to the base, thus the resilient member and the movable board of sufficient strength are required. Therefore, the structure is more complicated and the cost is increased.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views, and all the views are schematic.

DETAILED DESCRIPTION

Figure 1:
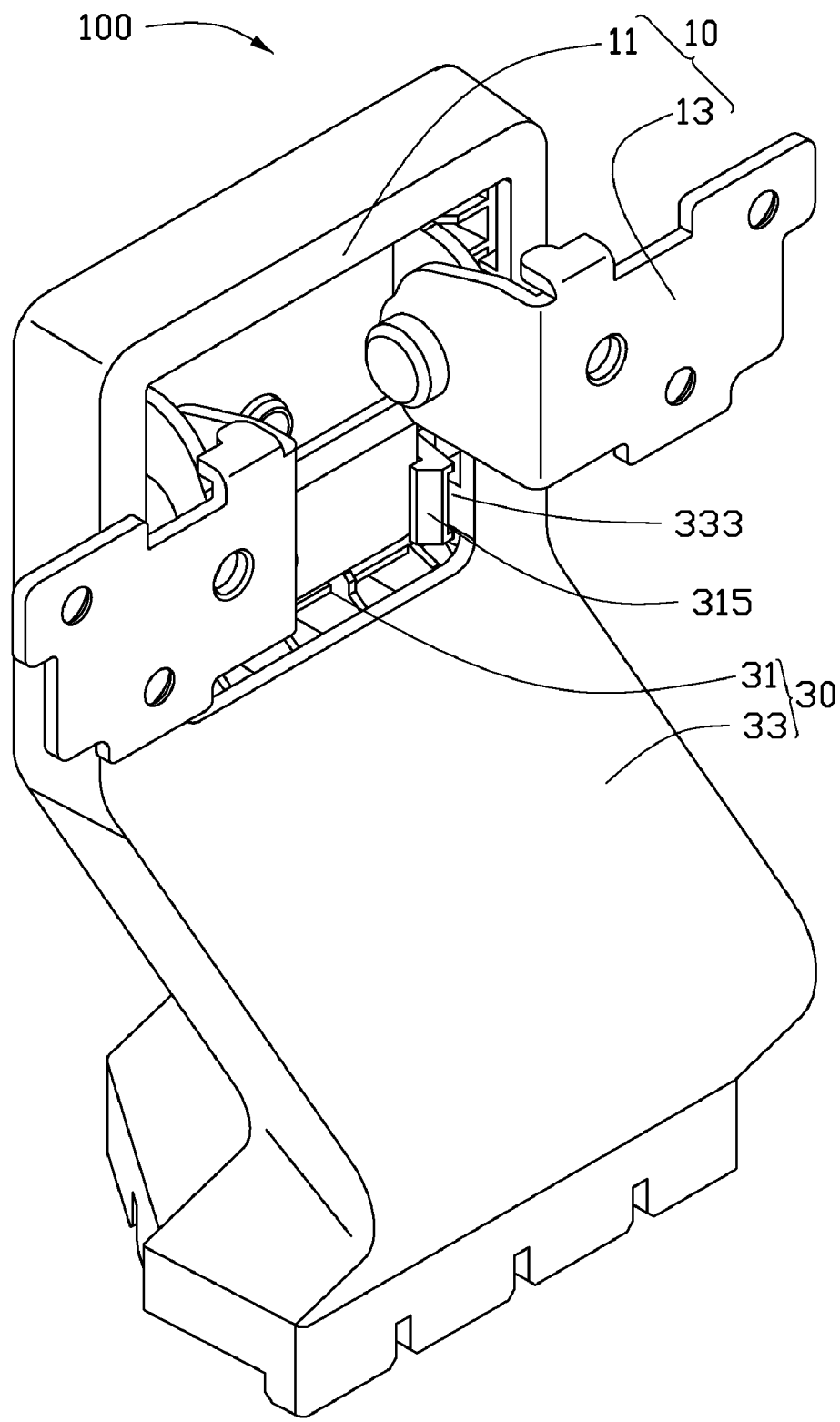
FIG. 1 is an assembled, isometric view of an embodiment of a support mechanism, including a bracket and a first cover.

Referring to FIG. 1, an embodiment of a support mechanism 100 includes a hinge assembly 10 and a base assembly 30 connected thereto.

Figure 2:
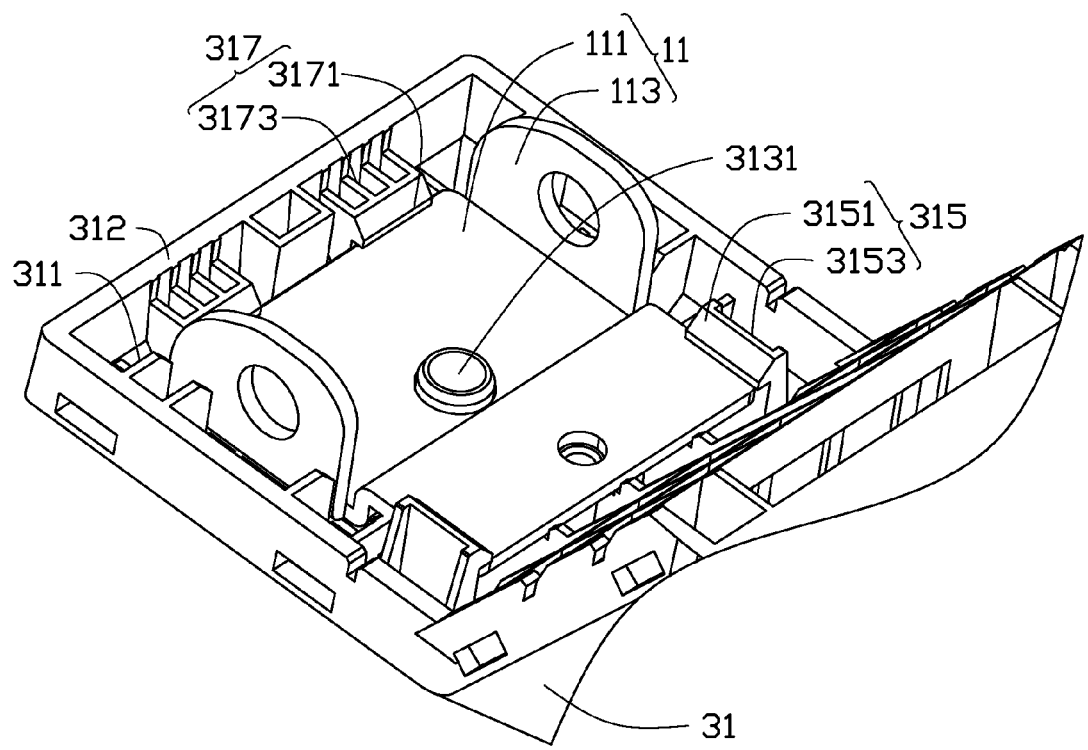
FIG. 2 is an assembled, isometric view of the bracket and the first cover of FIG. 1.
Figure 3:
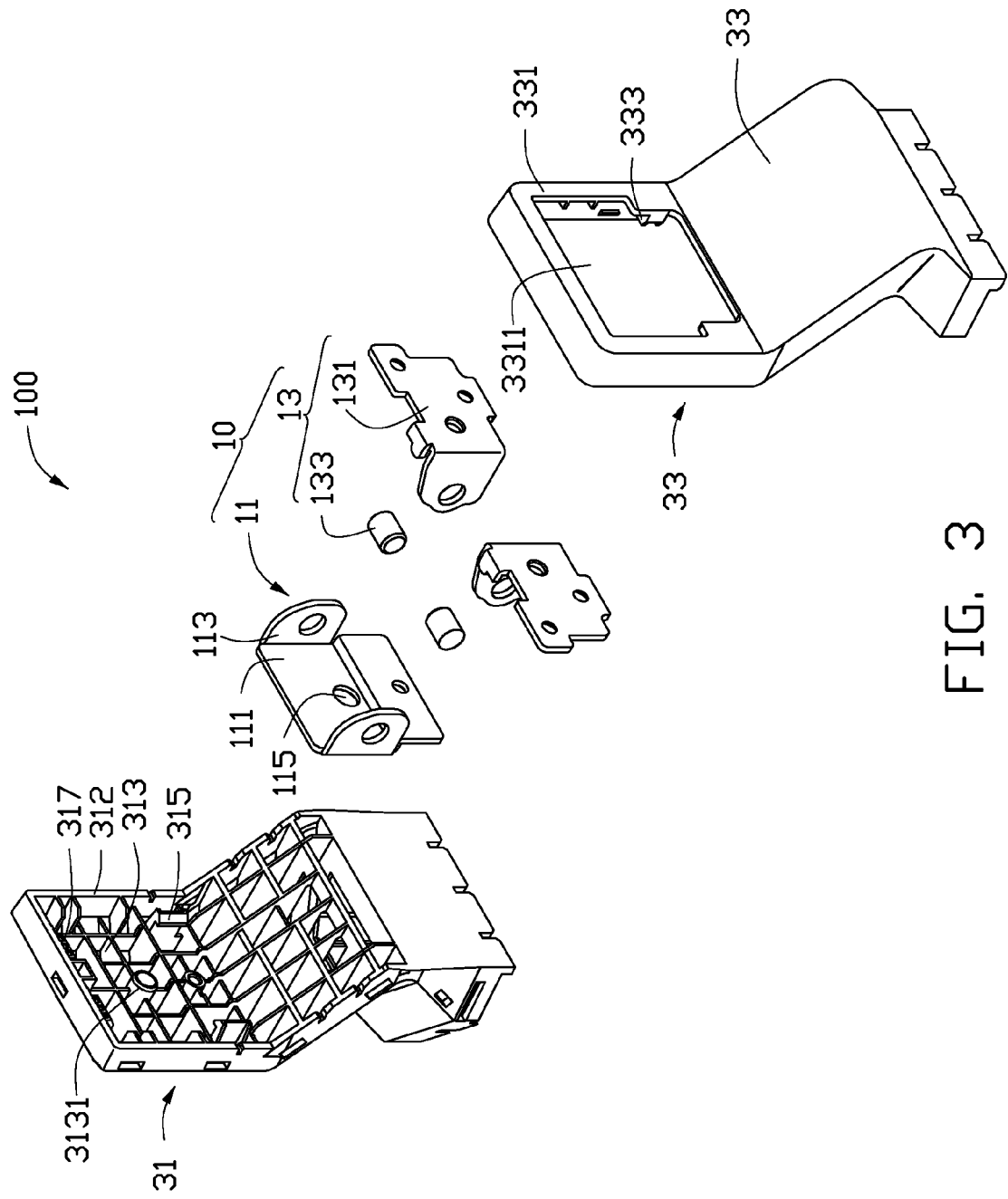
FIG. 3 is an exploded, isometric view of the support mechanism of FIG. 1.

Referring to FIGS. 2 and 3, the hinge assembly 10 includes a bracket 11 and two pivot units 13 connected thereto. The bracket 11 includes a fixing portion 111 and two connecting portions 113 extending from opposite sides of the fixing portion 111. The fixing portion 111 defines a positioning hole 115. Each pivot unit 13 includes a rotation member 131 and a pivot shaft 133; the pivot shaft 133 rotatably connecting the rotation member 131 and the connecting portion 113 of the bracket 11. The two pivot units 13 are pivotally connected to two connecting portions 113 of the bracket 11 respectively. It should be pointed out that the pivot units 13 are not limited to a quantity of two, and may be in the quantity of one which extends from one side of the fixing portion 111, and thus the number of pivot unit 13 is one correspondingly.

The base assembly 30 includes a first cover 31 and a second cover 33 attached to the first cover 31.

The first cover 31 includes a bottom wall 311 and a continuous sidewall 312 extending from one side of the bottom wall 311 and surrounding the bottom wall 311. The first cover 31 defines a receiving portion 313 and forms two first locking members 315 and two second locking members 317 on the bottom wall 311. The receiving portion 313 is used for accommodating the fixing portion 111 of the bracket 11. A positioning protrusion 3131 capable of engaging the positioning hole 115 of the hinge assembly 10 is formed in the receiving portion 313. The first locking members 315 and the second locking members 317 are formed in the receiving portion 313 and adjacent to the sidewall 312.

Each first locking member 315 forms a first latching portion 3151 and defines a receiving groove 3153 in a side thereof opposite to the first latching portion 3151, and the receiving groove 3153 is opposite to the sidewall 312. The latching portion 3151 of each first locking member 315 is away from the sidewall 312 of the first cover 31. The first locking members 315 may move when extra force is applied thereon. In the illustrated embodiment, the two first locking members 315 are positioned opposite to each other in the receiving portion 313 with a space therebetween. It should be noted that the number of first locking members 315 is not limited to two.

Each second locking member 317 includes a second latching portion 3171 and a plurality of strengthening ribs 3173 connecting the second latching portion 3171 and the sidewall 312. Alternatively, the strengthening ribs 3173 of the second locking members 317 may be omitted if the second locking members 317 had good quality of strength. Even further, the second locking members 317 may be omitted if the first locking members 315 are formed with strength large enough.

Figure 4:
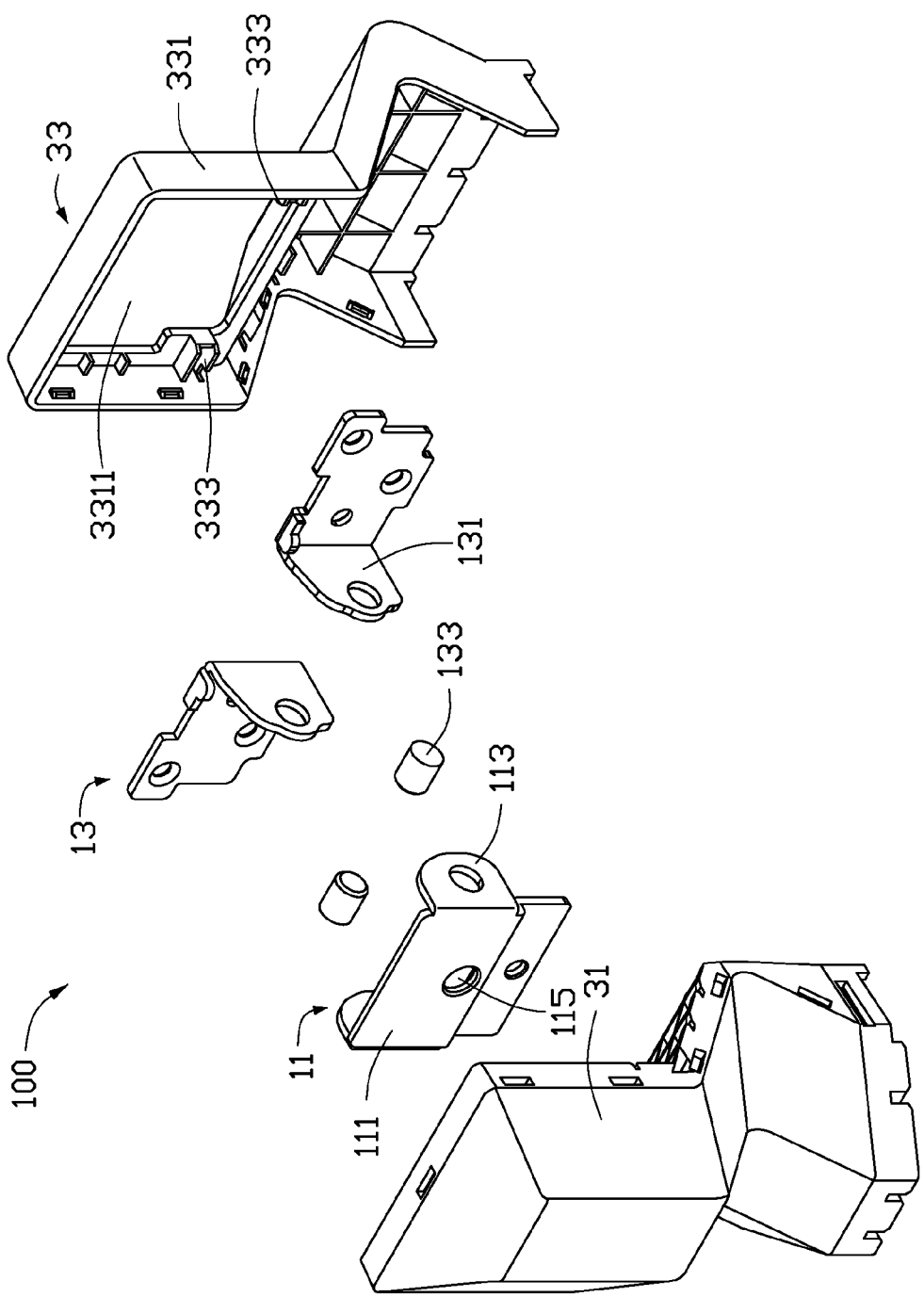
FIG. 4 is similar to FIG. 3, but viewed from another aspect.

Referring to FIGS. 3 and 4, the second cover 33 includes a main body 331 and two restriction members 333 formed on the main body 331. The main body 331 defines a receiving hole 3311. In the illustrated embodiment, the two restriction members 333 are positioned opposite to each other. The restriction members 333 are positioned corresponding to the receiving grooves 3153 of the first locking members 315. It should be noted that the number of the restriction members 333 may be only one or more than two according to the number of the first locking members 315 of the first cover 31.

Also referring to FIGS. 1 and 2, when the support mechanism 100 is assembled, the first locking members 315 are pulled to be separate, and the bracket 11 of the hinge assembly 10 can be positioned in the receiving portion 313 of the first cover 31 of the base assembly 30 between the two first locking members 315. Therefore, the fixing portion 111 of the bracket 11 is locked by the first locking portions 3151 of the first locking members 315 and the second latching portions 3171 of the second locking members 317. The positioning protrusion 3131 of the first cover 31 passes through the positioning hole 115 of the fixing portion 111. The first cover 31 and the second cover 33 are attached together. Thus, the restriction members 333 of the second cover 33 are received in the receiving grooves 3153 of the first locking members 315, thereby fixing the position of the first latching portion 3151 of the first locking members 315 and preventing the first locking members 315 from moving. Furthermore, the bracket 11 of the hinge assembly 10 is locked firmly. The connecting portions 113 of the bracket 11 wholly or partially extend out of the base assembly 30 through the receiving hole 3311 of the second cover 33; such that the pivot units 13 are hinged with the connecting portion 113.

In the support mechanism 100, the bracket 11 of the hinge assembly 10 is latched by the first locking members 315 and the second locking members 317 of the first cover 31 of the base assembly 30, thus no screws or resistant elements are required and other additional positioning structures are omitted. Furthermore, the support mechanism 100 is easily assembled or disassembled and the structure thereof is simpler. The restriction members 333 of the second cover 33 are latched with the first locking members 315 of the first cover 31, such that the bracket 11 of the hinge assembly 10 and the base assembly 30 are firmly locked.

Alternatively, the receiving grooves 3153 may be defined in the first cover 31, and the restriction members 333 of the second cover 33 received therein. The first locking members 315 may be formed on the second cover 33, and the restriction members 333 correspondingly formed on the first cover 31.

It is believed that the present embodiments and their advantages will be understood from the foregoing description, and it will be apparent that various changes may be made thereto without departing from the spirit and scope of the embodiments or sacrificing all of their material advantages.

What is claimed is:

1. A support mechanism, comprising:
   a base assembly comprising a first cover and a second cover attached to the first cover, the first cover forming at least one first locking member and the second cover forming at least one restriction member; and
   a hinge assembly comprising a bracket and at least one pivot unit rotatably connected to the bracket, the bracket comprising a fixing portion and at least one connecting portion extending from the fixing portion;
   wherein the at least one first locking member is latched with the fixing portion of the bracket, and the at least one restriction member engages with the at least one first locking member to prevent movement of the at least one first locking member, with the at least one first locking member sandwiched between the fixing portion of the bracket and the at least one restriction member, and
   wherein the first cover defines a receiving portion in which the fixing portion of the bracket is received, the first cover comprises a sidewall, the at least one first locking member is formed in the receiving portion, the at least one first locking member forms a first latching portion and defines a receiving groove, the first latching portion is away from the sidewall of the first cover, and the at least one restriction member of the second cover is received in the receiving groove.

2. The support mechanism of claim 1, wherein the at least one pivot unit comprises a rotation member and a pivot shaft, the rotation member rotatably connected to the connecting portion of the bracket by the pivot shaft.

3. The support mechanism of claim 1, wherein the first cover further forms at least one second locking member which comprises a second latching portion locking the bracket of the hinge assembly.

4. The support mechanism of claim 3, wherein the at least one second locking member further comprises a plurality of strengthening ribs connecting the second latching portion and the sidewall.

5. The support mechanism of claim 1, wherein the first cover further forms a positioning protrusion in the receiving portion, and the fixing portion of the bracket of the hinge assembly defines a positioning hole through which the positioning protrusion passes.

6. The support mechanism of claim 1, wherein the at least one first locking member is two first locking members, and the at least one restriction member is two restriction members.

7. The support mechanism of claim 2, wherein the second cover defines a receiving hole, through which the rotation member of the at least one pivot unit passes.

8. A support mechanism, comprising:
   a base assembly comprising a first cover and a second cover; and
   a hinge assembly comprising a bracket and at least one pivot unit rotatably connected to the bracket;
   wherein at least one first locking member is formed on one of the first cover and the second cover, and at least one restriction member is formed on the other one of the first cover and the second cover; the at least one first locking member is latched with the bracket of the hinge assembly; and the first cover is attached to the second cover by having the at least one first locking member engaging the at least one restriction member, with the at least one first locking member sandwiched between the bracket and the at least one restriction member, and
   wherein the bracket of the hinge assembly comprises a fixing portion and at least one connecting portion extending from one side of the fixing portion, the at least one locking member latched with the fixing portion; the at least one pivot unit comprises a rotation member and a pivot shaft, the pivot shaft rotatably connecting the rotation member and the connecting portion of the bracket; the first cover defines a receiving portion in which the fixing portion of the bracket is received; the at least one first locking member forms a first latching portion and defines a receiving groove, and the at least one restriction member is received in the receiving groove.

9. The support mechanism of claim 8, wherein the first cover forms at least one second locking member which comprises a second latching portion locking the bracket of the hinge assembly.

10. The support mechanism of claim 9, wherein the at least one first locking member is formed in the receiving portion of the first cover, and the at least one restriction member is formed on the second cover correspondingly.

11. The support mechanism of claim 10, wherein the first cover comprises a sidewall; the at least one first locking member is two first locking members, and the at least one second locking member is two second locking members correspondingly; the two first locking members are opposite to each other; and the first latching portion of each first locking member is away from the sidewall.

12. The support mechanism of claim 8, wherein the first cover further forms a positioning protrusion in the receiving portion, the positioning protrusion passing through a positioning hole defined by the fixing portion of the bracket of the hinge assembly.

13. The support mechanism of claim 8, wherein the second cover defines a receiving hole, through which the rotation member of the at least one pivot unit passes.

14. A support mechanism, comprising:
   a base assembly comprising a first cover and a second cover attached to the first cover, the first cover forming at least one first locking member and the second cover forming at least one restriction member; and
   a hinge assembly comprising a bracket and at least one pivot unit rotatably connected to the bracket, the bracket comprising a fixing portion and at least one connecting portion extending from the fixing portion;

wherein the at least one first locking member is latched with of the fixing portion of the bracket, and the at least one restriction member engages with the at least one first locking member to prevent movement of the at least one first locking member; and wherein the first cover defines a receiving portion in which the fixing portion of the bracket is received, the first cover comprises a sidewall, the at least one first locking member is formed in the receiving portion, the at least one first locking member forms a first latching portion and defines a receiving groove, the first latching portion is away from the sidewall of the first cover, and the at least one restriction member of the second cover is received in the receiving groove.

15. The support mechanism of claim 1, wherein the at least one first locking member comprises a hook abutting two adjacent surfaces of the fixing portion.

* * * * *